Oct. 8, 1968 W. S. MILLER 3,405,058
PURIFICATION OF WATER
Filed Feb. 17, 1964
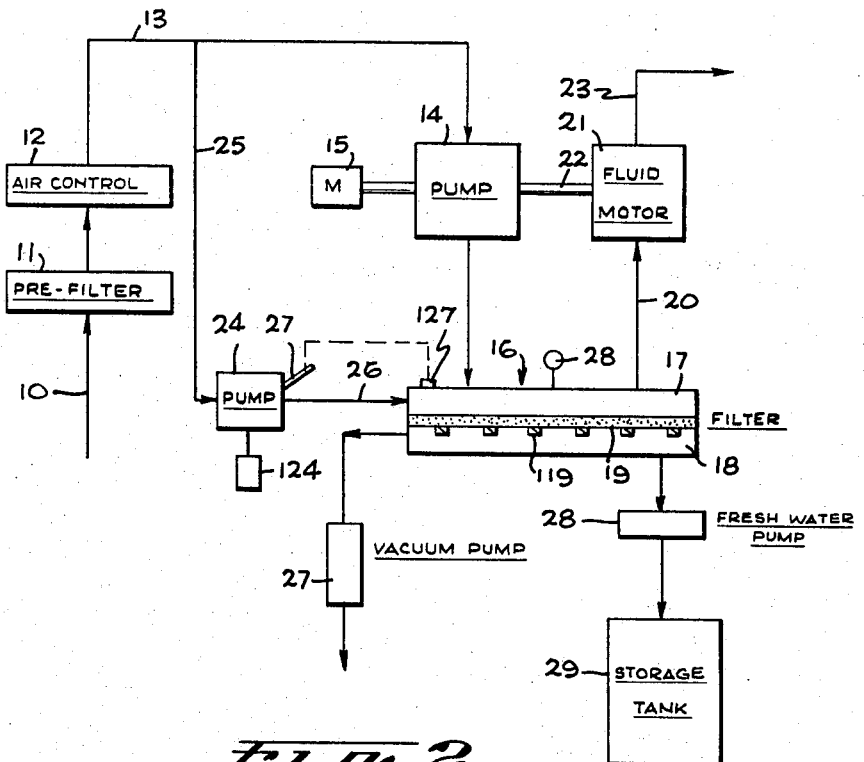
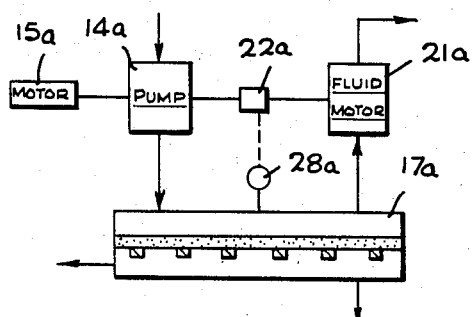
WENDELL S. MILLER
INVENTOR.
BY William P. Green
ATTORNEY

United States Patent Office 3,405,058
Patented Oct. 8, 1968

3,405,058
PURIFICATION OF WATER
Wendell S. Miller, 1341 Comstock Ave.,
Los Angeles, Calif. 90024
Filed Feb. 17, 1964, Ser. No. 345,243
25 Claims. (Cl. 210—23)

ABSTRACT OF THE DISCLOSURE

The process and apparatus for purifying water by forcing it through a filter having minute pores which are small enough, and which have pore walls of sufficiently hydrophobic character, to prevent passage of water in liquid form through the pores in spite of the maintenance of a pressure differential tending to cause such flow of the water, but with water in vapor form being capable of flowing through those same pores. The filter is preferably formed at least in part of a highly heat conductive metallic substance for conducting the heat of condensation of the water vapor from the discharge side of the filter back to its inlet side.

---

This invention relates to improved methods and apparatus for purifying impure waters, such as sea water, brackish water, sewage and the like.

Many different methods for removing impurities from water have been devised in the past. However, all of these previously proposed methods with which I am familiar have had certain inherent inefficiencies which have required the expenditure of an excessive amount of energy in some form during the purification process, with the result that the processes have not been economically practical or competitive as a primary source of pure water in quantity. For example, in many of the prior purification processes, the removal of impurities has been dependent upon heating of the impure water to boiling temperature, to evaporate it progressively for subsequent condensation as pure water. In other systems, a high vacuum has been relied upon to cause evaporation of the water at a relatively low temperature. In either case, however, it has been necessary to supply large quantities of energy, either in the form of heat or pumping energy, to evaporate a relatively small amount of water.

The general object of the present invention is to provide a purification process which is capable of removing impurities from water with considerably less energy than has been required in these previously devised processes. Preferably, the present process is performed isothermally, without the necessity for the addition of any heat to produce vaporization of the water, and with all other energy requirements reduced to an absolute minimum. This result is achieved by the use of a highly unique type of filtration system, which separates water in vapor form from water in liquid form with increased facility and efficiency as compared with the above discussed prior systems which have relied upon heating or vacuum techniques.

In purifying water by the present process, I utilize a filter through which water may pass relatively easily when in vapor form, but which is so constructed as to definitely prevent water in liquid form from passing therethrough. The impure water to be treated is positioned at one side of the filter, and is pressurized to a superatmospheric pressure. Water vapor then passes through the filter to its second side, and is condensed or accumulated at that side as pure water. The impurities and liquid water remain on the first side of the filter, and may be circulated to withdraw water with a slightly increased percentage of impurities from the apparatus, and simultaneously supply additional impure water to the apparatus. The second side of the filter may be maintained at a subatmospheric pressure, by a vacuum pump or the like, to maximize the rate of water flow through the filter.

To obtain these results, the filter is formed as a membrane of porous material, whose pores have hydrophobic surfaces, with the pores being small enough that the hydrophobic characteristic of the surfaces may effectively prevent the flow of water through the pores. However, these same pores, even though hydrophobic, are capable of passing water in vapor form through the pores and from one side of the filter to the other. Thus, the filter acts automatically to separate water vapor from water in liquid form. The membrane may be formed of a single microporous hydrophobic material, or as is preferred in many instances, the hydrophobic material may be present in the form of a coating substance applied to the pores of a high strength porous structure having sufficient rigidity to withstand the pressure being utilized. The porous material may in this case be a metal, such as porous nickel or copper (preferably the former), and the coating material may be a suitable hydrophobic siloxane.

One prior attempt at water purification which appears at first glance to have some pertinence to the present process is described in the Quarterly Progress Report for the period from Mar. 1, 1959, to May 31, 1959, of the Department of Engineering, University of California at Los Angeles. Report 59–46. In the portion of that report entitled "Sea Water Demineralization by the 'Surface Skimming' Process," reference is made to a process in which sea water was forced through a porous membrane of acetyl cellulose, with a resultant decrease in salinity. However, in that process the membrane was not sufficiently hydrophobic to prevent water from passing through it in liquid form, and to pass only water vapor as in my process, but instead the membrane of that prior process was specifically intended to allow flow of liquid water therethrough. As the liquid passed through the membrane, the salinity did decrease to some extent; but contrary to the present invention, a very substantial amount of salt was necessarily carried through the membrane with the water, and the process was therefore not effective, and could not be effective, to completely purify the water.

The above and other features and objects of the invention will be better understood from the following detailed description of the typical embodiments illustrated in the accompanying drawings, in which:

FIG. 1 is a diagrammatic representation of a purification process and apparatus embodying the invention; and FIG. 2 is a fragmentary representation of a variational form of process and apparatus.

Referring first to FIG. 1, a primary stream of impure water to be treated is supplied to the apparatus shown through an inlet line represented at 10. This water passes first through a pre-filter 11, which acts to mechanically remove from the impure water particulate matter such as dust, dirt, etc. From the pre-filter, the water may flow through a unit 12 which controls the amount of air present in the impure water to maintain the air at essentially a predetermined percentage within line 13 leading therefrom. Unit 12 may in some cases be an aerator, acting to dissolve air within the water to a predetermined percentage, or in other instances, unit 12 may be a deaerator acting to remove an excessive amount of air from the unit, again to maintain a predetermined percentage of air within the water.

From air control unit 12, the impure water passes to a positive displacement pump 14, typically a gear pump, which is driven at a predetermined uniform speed by a power energized motor 15, desirably an electric motor. Pump 14 acts to pump into a filter housing 16 a predetermined volume of water upon each revolution of the pump.

Housing 16 is a fluid tight casing capable of withstanding the pressure utilized in the apparatus, and divided into two chambers 17 and 18 by a filter element designated 19. Pump 14 forces the impure water under pressure into the upper of these chambers 17, from which the water discharges through a line 20 to a fluid motor 21, which may be a positive displacement gear motor identical with pump 14. Motor 21 is operatively connected to pump 14 by a drive shaft represented at 22, serving to connect the two units 14 and 21 directly together, to maintain a constant uniform volume of water within the high pressure space formed by chamber 17, the discharge side of pump 14, and the intake side of fluid motor 21. The impure water after leaving motor 21 discharges through a line 23 to a waste outlet or drain.

To initially develop a predetermined pressure within chamber 17, and to thereafter supply make-up water as necessary for maintaining that pressure, an auxiliary pump 24 may be provided, taking suction through a line 25 from the same source as pump 14, and discharging through a line 26 into chamber 17. Pump 24 may be controlled by a suitable automatic control 27, having a pressure sensing element 127 operable to automatically regulate the rate of operation of the pump to maintain the desired pressure within chamber 17 (as indicated on a guage represented at 28).

A vacuum is maintained in the lower chamber 18 of housing 16 by means of a vacuum pump represented at 27, typically taking suction from the upper portion of chamber 18 and discharging to atmosphere. Fresh water is removed from the lower portion of chamber 18 by a fresh water pump 28, which delivers the output into an accumulation tank 29 or the like.

As previously stated, the filter element 19 takes the form of a microporous diaphragm, having pores which extend through the entire vertical thickness thereof, to pass vapor from chamber 17 to chamber 18. The filter is peripherally secured to housing 16. The surfaces of the filter element which form the walls of its pores are hydrophobic, to prevent the passage of water in liquid form therethrough. As also previously indicated, the filter may in some cases be formed of a single material having sufficient rigidity and hydrophobic capacity to perform the functions of the filter; but it is preferred in many instances that the filter take the form of an essentially rigid preferably metal porous diphragm, whose pore walls may initially be hydrophilic but be permanently coated throughout the thickness of the diaphragm, and continuously along said walls, by a properly hydrophobic material. The most desirable of the currently known materials is a microporous nickel structure, for example that sold by General Electric as "Foametal." The metal utilized should be capable of withstanding corrosion for an extended period of time by salt water and other materials which may be present in the impure water, and nickel is very satisfactory from this standpoint. The hydrophobic coating applied to the internal and external surfaces of the nickel or other carrier material should be selected to adhere tightly and continuously to the surface of the nickel or the like, and should of course be insoluble in water. The coating may be a hydrophobic organic siloxane, formed by applying to the pore surfaces a suitable hydrophobic organic silane (sometimes referred to by the term "silicane"), such as a silane substituted with a hydrophobic group, e.g., a hydrocarbon or fluorocarbon radical. Preferred radicals to be substituted are any saturated or phenyl hydrocarbon grouping, or any corresponding fluorocarbon radical. As a specific example of a substance which may be employed as a hydrophobic coating on the nickel, I may utilize an equal part mixture of dimethyl, dichloro silane and tri-methyl, chloro silane, typically coated on the pore walls by the process outlined in U.S. Patent No. 2,589,705, issued to Kistler on Mar. 18, 1952. Upon application, the silane reacts with moisture present on the part being treated to form the corresponding siloxane, still of course substituted with the hydrocarbon or fluorocarbon radical. Instead of such a silane, I may employ as the hydrophobic coating a substance such as aluminum stearate, aluminum perfluorostearate, or any other appropriately hydrophobic and adherant material adapted to withstand the encountered conditions.

Instead of the coated metal type of diaphragm discussed above, I may utilize any other microporous hydrophobic structure capable of withstanding the conditions encountered in use, such as for example a microporous hydrophobic resinous plastic material or cellulosic material. A microporous plastic material which may be employed as the membrane is that disclosed in U.S. Patent No. 3,116,355, issued Dec. 31, 1963, to Harry G. Oswin. To give examples of commercially available filter material usable for the present purposes, I may employ the microporous cellulosic filter materials, or the microporous resinous plastic filter material produced by Gelman Instrument Co. of Chelsea, Mich., and sold under the specified designations; or the cellulosic microporous material sold as "Millipore Filters" by Millipore Company of New Bedford, Mass. The pore size of any of these materials, or of the porous nickel or other metal which may be utilized as discussed above, may be effectively reduced by partially plugging the pores of the porous material with minute particles of a suitable plugging substance. For example, I may plug the pores of a basic material with finely divided flocculent nickel or nickel spheres, both as obtainable by the carbonyl process for production of primary nickel. Also, I may partially plug the pores by a very finely divided powder of a silica gel waterproofed in a manner discussed in the above identified Patent No. 2,589,705, and crushed to the desired powdered form. If the plugging material or the main porous matrix is not suitably waterproofed prior to the plugging operation, the entire structure may be waterproofed after plugging by a suitable process such as the silane (siloxane) process discussed in the above identified Patent No. 2,589,705.

Diaphragm 19 may be supported on a reinforcing grid 119, typically formed of an appropriate rigid metal having sufficient strength and rigidity to assist the diaphragm in effectively withstanding the pressure differential which is encountered. Also, the grid may be formed of a hydrophilic or water wettable material, such as stainless steel, to serve as a condensation surface in intimate contact with the membrane and on which the vapor which passes through the diaphragm may collect.

To describe the operation of the apparatus of FIG. 1, assume that sea water or other impure water to be treated is fed into line 10, and motor 15 is energized to drive pump 14 and fluid motor 21 in unison. The entire chamber 17 and the lines therefrom communicating with pump 14, motor 21 and pump 24 are completely filled with fluid, as are the pumps 14 and 24 and motor 21 themselves. As motor 15 turns, it causes pump 14 to force impure water under pressure through chamber 17, in contact with the upper surface of filter 19, and through line 20 to motor 21. The pressure of the fluid drives motor 21, which in turn assists in driving pump 14 through shaft 22, so that a circulation of impure water is maintained through chamber 17, under any desired very substantial pressure, with very little expenditure of energy. Such energy as must be supplied, to overcome frictional losses, to force water vapor through filter 19, and to attain conversion of impure water to fresh water in the system, is supplied by motor 15 and a motor 124 driving pump 24. The pump 14 and motor 21 may themselves be designed to initially attain the desired pressurized condition within chamber 17, but in the particular arrangement illustrated in FIG. 1, I disclose as a means of initially pressurizing the chamber 17 the auxiliary motor driven pump 24. This pump is energized to initially develop the desired pressure within chamber 17, and is energized thereafter at such intervals as are necessary to compensate for any leakage or reduction in pressure within chamber 17, and to always maintain the desired pressure level.

The hydrophobic pores within filter 19 repel water so effectively that no water in liquid form can pass downwardly through the filter from chamber 17 to chamber 18. However, the pores will pass water in vapor form downwardly, to chamber 18, to be condensed therein and withdrawn by fresh water pump 28 to accumulation tank 29. This flow of vapor through the pores may be enhanced by the maintenance of a low pressure within chamber 18, by vacuum pump 27. Fluid motor 21 continuously removes water of slightly increased impurity (increased salinity when the water being treated is salt water) from chamber 17, and discharges it to waste through line 23; and pumps 14 and 24 continuously replace the water thus removed with additional pre-filtered feed water from line 13.

The diaphragm is desirably of a material having high heat conductivity (preferably above about .1 calorie/cm. sec. °C.), so that heat of condensation of the water at the underside of the diaphragm is conducted readily to its upper side, to compensate for the cooling effect which tends to occur upon vaporization, so that the temperature of the diaphragm is substantially the same throughout its thickness, and the entire process is therefore substantially isothermal. Being isothermal, the process is thermodynamically reversible, and therefore does not require the expenditure of more than the very smallest possible amount of energy.

FIG. 2 represents fragmentarily an arrangement which may be considered as identical with that of FIG. 1, except as to the manner in which the pressure within chamber 17a is initially developed and maintained. In this arrangement, pump 14a and fluid motor 21a are adapted to be driven differentially in order to develop or maintain a pressure within chamber 17a. More specifically, pump 14a may be driven by motor 15a at a constant speed, while fluid motor 21a may be connected to pump 14a through a variable speed transmission 22a, in order that a differential between the rate of rotation of the units 14a and 21a may develop and regulate the pressure within chamber 17a. When the pump 14a is initially energized, transmission 22a is so adjusted that motor 21a turns only very slowly as compared with the pump, to thereby quickly develop a desired operating pressure within chamber 17a. After that pressure has been attained, a pressure sensing device 28a connected to chamber 17a automatically actuates transmission 22a to allow an increase in the relative speed of motor 21a, and to thereafter continuously regulate the transmission to automatically maintain the desired pressure and a constant volume of water within the pressurized system.

In order to prevent water in liquid form from passing through the filter membrane, it is desirable that the following relationship be maintained:

$$r < \frac{2(\gamma_{12} - \gamma_1)}{P}$$

where:

$\gamma_{12}$ is the interfacial tension between water in liquid form and the hydrophobic pore surfaces, in dynes per centimeter $\gamma_1$ is the surface tension corresponding to the surface energy of the hydrophobic pore surfaces in dynes per centimeter $r$ is the effective radius of the pore cross-section at the water interface, in centimeters $P$ is the pressure of the impure water in dynes per square centimeter.

Also, in order to assure that the pressure of the impure or salt water at the upper side of the filter membrane is great enough to force vapor through the pores, the following relationship should be maintained:

$$P > FTR$$

where:

$P$ is the pressure in p.s.i. applied to the impure water
$T$ is the temperature of the water in degrees Kelvin
$R$ is the gas constant of the water in liter pounds per square inch per degree mol
$F$ is the mol activity of the dissolved solutes (1.026 for sea water).

For sea water, this formula requires a pressure of at least about 370 p.s.i. at 300 degrees Kelvin. For other types of water, the pressure may be lower.

In most instances the size of the pores in the filter will be less than about one micron.

An alternative explanation as to how the increase in pressure of the impure water, at the location of the porous membrane, increases its vapor pressure, is brought out by reference to the following equation relating the curvature of a liquid surface to its fugacity (or vapor pressure):

$$RT \ln \frac{f}{f^0} = \frac{2\gamma V}{r}$$

where $R$ = the gas constant.
$T$ = temperature Kelvin.
$f$ = fugacity of the liquid in a condition supporting a surface of radius $r$.
$f^0$ = fugacity of the liquid under normal conditions.
$\gamma$ = surface tension of the liquid.
$V$ = molar volume of the liquid.

This equation may be found in an article by W. T. Thomson, in Philosophical Magazine, (4), 42, 448 (1881). The curved surface is developed in the present apparatus by the novel expedient of applying pressure to the liquid in contact with a microporous hydrophobic body, to form minute curved surfaces at the locations of the individual pores.

As stated previously, air control unit 12 may in some cases be an aerator, and in other cases be a deaerator, in either situation acting to maintain a predetermined condition as to air content of the water. It is contemplated that there are advantages and disadvantages to both aeration and deaeration. For example, if the water being treated is kept completely free of air, the necessity for vacuum pump 27 is removed. On the other hand, if a substantial amount of air is present this air will, in passing through the porous membrane, assist in sweeping or forcing the water vapor through the pores. Consequently, it is felt that for most installations, there will be an optimum condition as to air content, which will be a compromise between the two extremes, and which condition will be maintained by unit 12.

I claim:

1. Apparatus for purifying water comprising a filter having minute pores which have hydrophobic surfaces and are permeable by water vapor but are small enough to prevent passage of water in liquid form therethrough, and means for pressurizing a body of impure water at a first side of said filter to a superatmospheric pressure high enough to force water vapor through said pores to the second side of the filter without forcing therethrough water in liquid form, said pressurizing means including a pump for feeding impure water to said filter, and a fluid motor operatively connected to said pump for operation essentially in unison therewith and past which water with more concentrated impurities is withdrawn from the filter.

2. Apparatus for purifying water comprising a housing structure, a filter membrane in said housing structure separating a first chamber from a second chamber, said filter having minute pores which have hydrophobic surfaces and are permeable by water vapor but are small enough to prevent passage of water in liquid form therethrough, a pump for forcing impure water under pressure into said first chamber and maintaining said water at a superatmospheric pressure high enough to force water vapor through said pores to said second chamber without forcing therethrough water in liquid form, a fluid motor past which impure water discharges from said first chamber and operatively connected to said pump to be driven in accordance therewith and thereby maintain said impure water under pressure, vacuum pump means for maintaining a subatmospheric pressure in said second chamber, and a pump for withdrawing condensed fresh water from said second chamber.

3. Apparatus for purifying water comprising a housing structure, a filter in said housing structure separating a first chamber from a second chamber, said filter including a membrane of porous nickel having pores less than about one micron in size and coated with a hydrophobic hydrocarbon substituted siloxane, said filter having minute pores which have hydrophobic surfaces and are permeable by water vapor but are small enough to prevent passage of water in liquid form therethrough, a pump for forcing impure water under pressure into said first chamber and maintaining said water at a superatmospheric pressure high enough to force water vapor through said pores to said second chamber without forcing therethrough water in liquid form, a fluid motor past which impure water discharges from said first chamber and operatively connected to said pump to be driven in accordance therewith and thereby maintain said impure water under pressure, vacuum pump means for maintaining a subatmospheric pressure in said second chamber, and a pump for withdrawing condensed fresh water from said second chamber.

4. The method of purifying water that comprises locating impure water at a first side of a filter which has minute pores with hydrophobic pore wall surfaces, maintaining a pressure drop between said first side of the filter and its second side through said pores tending to force said water through the pores to said second side of the filter, preventing flow of said water in liquid form through said pores to said second side of the filter by the hydrophobic effect of said pore wall surfaces in conjunction with the small size of the pores, said hydrophobic effect and said small pore size being the major factors in preventing said liquid water flow, and forcing water vapor through said pores by said pressure drop.

5. The method as recited in claim 4, including maintaining said impure water at a superatmospheric pressure.

6. The method as recited in claim 4, including maintaining said impure water at a superatmospheric pressure, and maintaining a subatmospheric pressure in communication with said pores at said second side of the filter.

7. The method as recited in claim 4, including continuously withdrawing water in liquid form from said first side of the filter other than through the filter, and continuously adding more impure water to said first side of the filter.

8. The method as recited in claim 4, in which said hydrophobic pore wall surfaces are formed of organic hydrophobic siloxane.

9. The method as recited in claim 4, in which said pores are less than about one micron in size.

10. The method as recited in claim 4, including maintaining said impure water at said first side of the filter at a pressure which is superatmospheric but at which:

$$r < \frac{2(\gamma_{12} - \gamma_1)}{P}$$

where:

$\gamma_{12}$ is the interfacial tension between water and said hydrophobic pore surfaces in dynes per centimeter.

$\gamma_1$ is the surface tension corresponding to the surface energy of the hydrophobic pore surfaces, in dynes per centimeter.

$r$ is the effective radius of the pore cross section at the water interface, in centimeters.

$P$ is the pressure of the impure water in dynes per square centimeter (less any pressure at the discharge side of the filter).

11. The method as recited in claim 4, including condensing said vapor after passage through said pores to said second side of the filter.

12. The method as recited in claim 4, including aerating or deaerating said impure water before passage of the water in vapor form through said filter.

13. The method as recited in claim 4, including maintaining $$P > FTR$$

where:

$P$ is the pressure in p.s.i. applied to the impure water (less the pressure at the discharge side of the filter).

$T$ is the temperature of the water in degrees Kelvin.

$R$ is the gas constant of the water in liter pounds per square inch per degree mol.

$F$ is the mol activity of the dissolved solutes.

14. The method of purifying water that comprises locating impure water at a first side of a filter which has minute pores with hydrophobic pore wall surfaces, maintaining a pressure drop between said first side of the filter and its second side through said pores tending to force said water through the pores to said second side of the filter, preventing flow of said water in liquid form through said pores to said second side of the filter by the hydrophobic effect of said pore wall surfaces in conjunction with the small size of the pores, said hydrophobic effect and said small pore size being the major factors in preventing said liquid water flow, forcing water vapor through said pores by said pressure drop, condensing said vapor at said second side of the filter, and conducting the heat of condensation of said vapor rapidly through the material of said filter from said second side thereof to said first side to replace the heat of vaporization absorbed upon formation of the vapor.

15. Apparatus for purifying water, comprising a filter having minute pores which are permeable by water vapor and which have hydrophobic pore wall surfaces, means forming a chamber containing a body of impure water at a first side of said filter, and means for maintaining a pressure drop between said first side of the filter and its second side through said pores tending to force said water through the pores to said second side, said pore wall surfaces being sufficiently hydrophobic, in relation to the small size of the pores, to act, by said hydrophobic effect, to prevent flow of said water in liquid form through the pores to said second side of the filter, in spite of said pressure drop, said hydrophobic effect and said small pore size being the major factors in preventing said liquid water flow, said pressure drop acting however to force water in vapor form through the pores to said second side.

16. Apparatus as recited in claim 15, in which said means for maintaining said pressure drop include means for maintaining a superatmospheric pressure at said first side of the filter.

17. Apparatus as recited in claim 15, in which said means for maintaining said pressure drop include means for maintaining a superatmospheric pressure at said first side of the filter, and a subatmospheric pressure in communication with the pores at said second side of the filter.

18. Apparatus as recited in claim 15, including means for condensing and collecting said vapor at said second side of the filter.

19. Apparatus as recited in claim 15, in which said means for maintaining said pressure drop include circulating means for progressively feeding impure water to, and withdrawing water with more concentrated impurities from, said body of water at said first side of the filter.

20. Apparatus as recited in claim 15, in which said pores are less than about one micron in size.

21. Apparatus as recited in claim 15, in which said pore wall surfaces are formed of hydrophobic organic siloxane.

22. Apparatus as recited in claim 15, including maintaining a superatmospheric pressure at said first side of the filter but at a value such that:

$$r < \frac{2(\gamma_{12} - \gamma_1)}{P}$$

where:
$\gamma_{12}$ is the interfacial tension between water and said hydrophobic pore surfaces in dynes per centimeter.
$\gamma_1$ is the surface tension corresponding to the surface energy of the hydrophobic pore surfaces, in dynes per centimeter.
$r$ is the effective radius of the pore cross section at the water interface, in centimeters.
$P$ is the pressure of the impure water in dynes per square centimeter (less pressure at opposite side of filter).

23. Apparatus as recited in claim 15, including maintaining a superatmospheric pressure at said first side of the filter at a value such that said pressure P is greater than the product of $F \times T \times R$, where:
$P$ is the pressure in p.s.i. applied to the impure water (less pressure at opposite side of filter).
$T$ is the temperature of the water in degrees Kelvin.
$R$ is the gas constant of the water in liter pounds per square inch per degree mol.
$F$ is the mol activity of the dissolved solutes.

24. Apparatus for purifying water, comprising a filter having minute pores which are permeable by water vapor and which have hydrophobic pore wall surfaces, means forming a chamber containing a body of impure water at a first side of said filter, means for maintaining a pressure drop between said first side of the filter and its second side through said pores tending to force said water through the pores to said second side, said pore wall surfaces being sufficiently hydrophobic, in relation to the small size of the pores, to act, by said hydrophobic effect, to prevent flow of said water in liquid form through the pores to said second side of the filter, in spite of said pressure drop, said hydrophobic effect and said small pore size being the major factors in preventing said liquid water flow, said pressure drop acting however to force water in vapor form through the pores to said second side, and means for aerating or deaerating said impure water fed to the filter.

25. Apparatus for purifying water, comprising a filter having minute pores which are permeable by water vapor, said filter being formed of porous metal coated with a hydrophobic material forming the walls of said pores, means forming a chamber containing a body of impure water at a first side of said filter, and means for maintaining a pressure drop between said first side of the filter and its second side through said pores tending to force said water through the pores to said second side, said pore walls being sufficiently hydrophobic, in relation to the small size of the pores, to act, by said hydrophobic effect, to prevent flow of said water in liquid form through the pores to said second side of the filter, in spite of said pressure drop, said pressure drop acting however to force water in vapor form through the pores to said second side, said metal of the filter being highly heat conductive to rapidly conduct heat of condensation from said second side of the filter to its first side.

References Cited

UNITED STATES PATENTS 3,133,132  5/1964  Loeb et al. _____ 210—23 X

OTHER REFERENCES

Hassler, G. L., et al., Osmosis Through a Vapor Gap Supported by Capillarity, appearing in Saline Water Conversion, Advances in Chemistry Series, No. 27, 1960 American Chemical Society, Washington, D.C., pp. 192–205 (P.O.S.L.).

Loeb, S., et al., Sea Water Demineralization by means of an Osmotic Membrane, appearing in Saline Water Conversion–II, Advances in Chemistry Series No. 38, 1963, American Chemical Society, Washington, D.C., pp. 117–122 and 129–132 relied on.

MICHAEL E. ROGERS, *Primary Examiner.*